United States Patent [19]
Wada et al.

[11] Patent Number: 5,741,595
[45] Date of Patent: Apr. 21, 1998

[54] ULTRAVIOLET OPTICAL PART HAVING COAT OF ULTRAVIOLET OPTICAL THIN FILM, AND WAVELENGTH-CHANGING DEVICE AND ULTRAVIOLET LIGHT SOURCE UNIT HAVING COAT OF ULTRAVIOLET OPTICAL THIN FILM

[75] Inventors: Hiroyuki Wada, Kanagawa; Nobuhiko Umezu, Chiba; Minehiro Tonosaki; Michio Oka, both of Kanagawa, all of Japan

[73] Assignee: Sony Corporation, Tokyo, Japan

[21] Appl. No.: 749,632

[22] Filed: Nov. 15, 1996

[30] Foreign Application Priority Data

Nov. 17, 1995 [JP] Japan ................................. 7-300060

[51] Int. Cl.⁶ ........................................ B32B 17/06
[52] U.S. Cl. .......................... 428/426; 372/21; 372/22; 372/23
[58] Field of Search ............................. 428/426; 372/21, 372/22, 23

[56] References Cited

U.S. PATENT DOCUMENTS

| | | | |
|---|---|---|---|
| 4,061,921 | 12/1977 | Cantrell et al. | 372/23 |
| 5,487,079 | 1/1996 | Esterowitz et al. | 372/23 |

*Primary Examiner*—Melvin I. Marquis
*Attorney, Agent, or Firm*—Hill & Simpson

[57] ABSTRACT

The present invention provides an ultraviolet optical part having an ultraviolet optical thin film having a high durability against ultraviolet rays. The ultraviolet optical part is used in connection with ultraviolet rays continuously generated in a wavelength of 200 through 300 nm, and comprises an optical component and an ultraviolet optical thin film formed the optical component, wherein the ultraviolet optical thin film comprises a material having a thermal conductivity of $0.01 \, J \cdot cm^{-1} \cdot sec^{-1} \cdot K^{-1}$ or greater. The ultraviolet optical thin film may comprise an $HfO_2$ layer 10 and $MgF_2$ layer 11, or may comprise an $HfO_2$ layer 10, an MgO layer 12, and $MgF_2$ layer 11. Further, the present invention provides a wavelength-changing device having a high durability against ultraviolet rays, the wavelength-changing device comprising a non-linear optical crystal and the ultraviolet optical thin film formed on the optical crystal. The non-linear optical crystal may comprise BBO or KDP.

9 Claims, 5 Drawing Sheets

FIG. IA
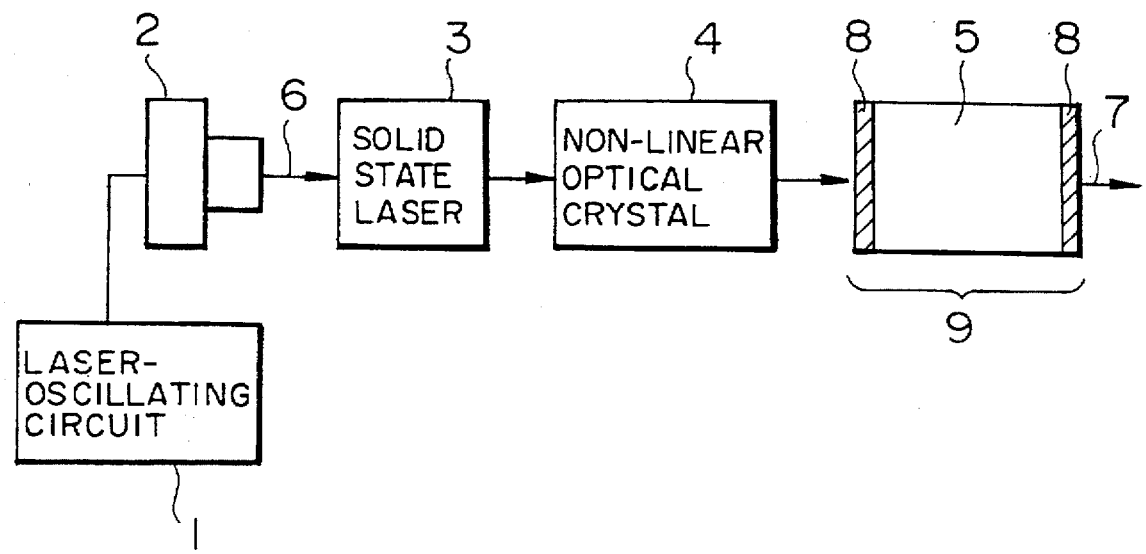
FIG. IB
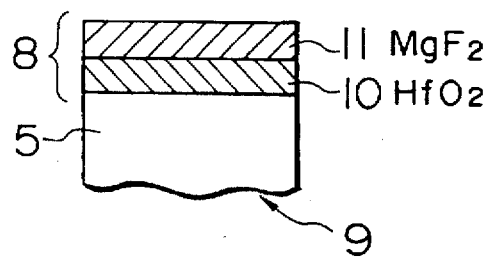
FIG. IC
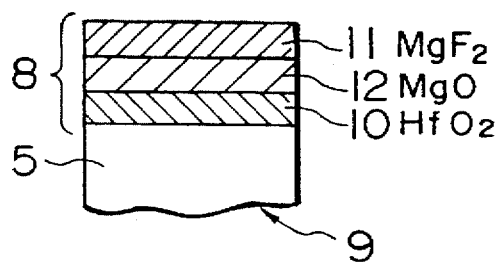

ULTRAVIOLET OPTICAL PART HAVING COAT OF ULTRAVIOLET OPTICAL THIN FILM, AND WAVELENGTH-CHANGING DEVICE AND ULTRAVIOLET LIGHT SOURCE UNIT HAVING COAT OF ULTRAVIOLET OPTICAL THIN FILM

BACKGROUND OF THE INVENTION

1. Field of the Invention

The present invention relates to an optical part for use in connection with ultraviolet rays (herein after, referred to as an ultraviolet optical part). The ultraviolet optical part has a coat of an ultraviolet optical thin film.

2. Description of the Related Art

Recently, the field of optoelectronics relating to information processing, instrumentation control, or the like has remarkably developed. According to this development, there are increasing demands for a higher processing speed, improved control performance, and a higher capacity in the volume of information to be processed. Due to this, it has been an important subject to obtain a laser beam having a shorter wavelength and a higher output level.

For shortening the wavelength of a laser beam, in general, the second higher harmonic or the forth higher harmonic of a fundamental wave are generated by using non-linear crystals, as disclosed in the specification of U.S. Pat. No. 5,473,409. FIG. 8 shows the construction of an ultraviolet light source unit in relation to such a method for shortening the wavelength of a laser beam by using non-linear optical crystals as wavelength-changing devices.

In this method, the objective laser beam having a shorter wavelength is obtained through wavelength-changing devices comprising non-linear optical crystals since semiconductor lasers can rarely be oscillated in a shorter-wave region. As is shown in FIG. 8, a semiconductor laser 2 is oscillated with a laser-oscillating circuit 1 to emit a laser beam 6. The laser beam 6 then excites a solid state laser 3 such as a YAG laser. The laser beam emitted from the excited solid state laser 3 is incident on a non-linear optical crystal 4, and the wavelength is changed by utilizing a phenomenon of generating the second higher harmonic (SHG phenomenon). The laser beam having the changed wavelength is incident on a non-linear optical crystal 5, and the wavelength is further changed by utilizing a phenomenon of generating the forth higher harmonic (FHG phenomenon). The objective ultraviolet ray 7 is obtained through this wavelength-changing process.

Though not shown in FIG. 8, an ultraviolet optical thin film having a lower reflectance against the ultraviolet ray 7 is vacuum-deposited on the non-linear optical crystal 5. The ultraviolet optical thin films of the prior art are, however, destroyed within a short time such as a few seconds or a few minutes due to the heat generated by the high-powered ultraviolet ray 7, and therefore, they cannot be expected to have reliability for long-term use. Accordingly, a wavelength-changing device which can efficiently change wavelengths could not been obtained. FIG. 9 shows time-lapse changes in performance of ultraviolet optical thin films. The time-lapse change of a conventional ultraviolet optical thin film is indicated with the curve b in FIG. 9. As is obvious from this figure, the conventional ultraviolet optical thin film deteriorates within a short time. In this test on the time-lapse change in performance, the ultraviolet optical thin film for use with a 226 nm ultraviolet ray was irradiated with an ultraviolet ray having an output of 100 mW, a power density of 1 kW/cm², and a wavelength of 226 nm, and the index is the loss attributed to reflection, scattering, and absorption.

SUMMARY OF THE INVENTION

Accordingly, the present invention has been accomplished aiming to provide an ultraviolet optical part which efficiently shortens the wavelengths of laser beams and has long-term reliability, wherein the ultraviolet optical part comprises a non-linear optical crystal which generates higher harmonics, and an ultraviolet optical thin film which is formed on the non-linear optical crystal and has excellent durability against high-output ultraviolet rays.

An aspect of the present invention is an ultraviolet optical part for use in connection with ultraviolet rays continuously generated in a wavelength of 200 through 300 nm, wherein the ultraviolet optical part comprises an optical component and an ultraviolet optical thin film formed on the optical component by using materials which have thermal conductivities of 0.01 $J \cdot cm^{-1} \cdot sec^{-1} \cdot K^{-1}$ or greater.

Specifically, the ultraviolet optical thin film may be formed with hafnium oxide (hereinafter, indicated with $HfO_2$) and magnesium fluoride (hereinafter, indicated with $MgF_2$). Alternatively, the ultraviolet optical thin film may be formed with $HfO_2$, magnesium oxide (hereinafter, indicated with MgO), and $MgF_2$.

Further, another aspect of the present invention is a wavelength-changing device comprising an optical crystal which continuously generates an ultraviolet higher harmonic having a wavelength of 200 through 300 nm, and an ultraviolet optical thin film formed on the crystal by using materials which have thermal conductivities of 0.01 $J \cdot cm^{-1} \cdot sec^{-1} \cdot K^{-1}$ or greater.

Specifically, the wavelength-changing device may be composed by using $HfO_2$ and $MgF_2$ as the materials of the ultraviolet optical thin film. Alternatively, the wavelength-changing device may be composed by using $HfO_2$, MgO, and $MgF_2$ as the materials of the ultraviolet optical thin film.

Additionally, the wavelength-changing device may be composed by using β-barium borate ($BaB_2O_4$; hereinafter, indicated with BBO) as the material of the optical crystal. Alternatively, the wavelength-changing device may be composed by using potassium dihydrogenphosphate (hereinafter, indicated with KDP) as the material of the optical crystal.

Moreover, another aspect of the present invention is an ultraviolet light source unit comprising an illuminant which emits a fundamental wave, and an optical crystal which changes the fundamental wave incident on the optical crystal into an ultraviolet higher harmonic having a wave length of 200 through 300 nm, wherein an ultraviolet optical thin film having a thermal conductivity of 0.01 $J \cdot cm^{-1} \cdot sec^{-1} \cdot K^{-1}$ or greater is formed on the optical crystal.

Since the ultraviolet optical thin film is formed using materials which have thermal conductivities of 0.01 $J \cdot cm^{-1} \cdot sec^{-1} \cdot K^{-1}$ or greater, the ultraviolet optical part according to the present invention has no fear of being destroyed by continuously generated ultraviolet rays, has a higher durability against high-output ultraviolet rays, and maintains long-term reliability.

Also, since the ultraviolet optical thin film having high durability against ultraviolet rays is formed on an optical crystal, the wavelength-changing device according to the present invention maintains long-term reliability in use with continuously generated ultraviolet rays.

BRIEF DESCRIPTION OF THE DRAWINGS

FIG. 1(a) is a schematic drawing showing an example of the construction of an ultraviolet light source unit in relation to the present invention, wherein the wavelength of a laser beam emitted from a semiconductor laser is shorten by using two wavelength-changing devices, FIG. 1(b) is a schematic drawing showing a structural example of an ultraviolet optical thin film according to the present invention, and FIG. 1(c) is a schematic drawing showing a structural example of another ultraviolet optical thin film according to the present invention;

DESCRIPTION OF THE PREFERRED EMBODIMENT

Figure 2:
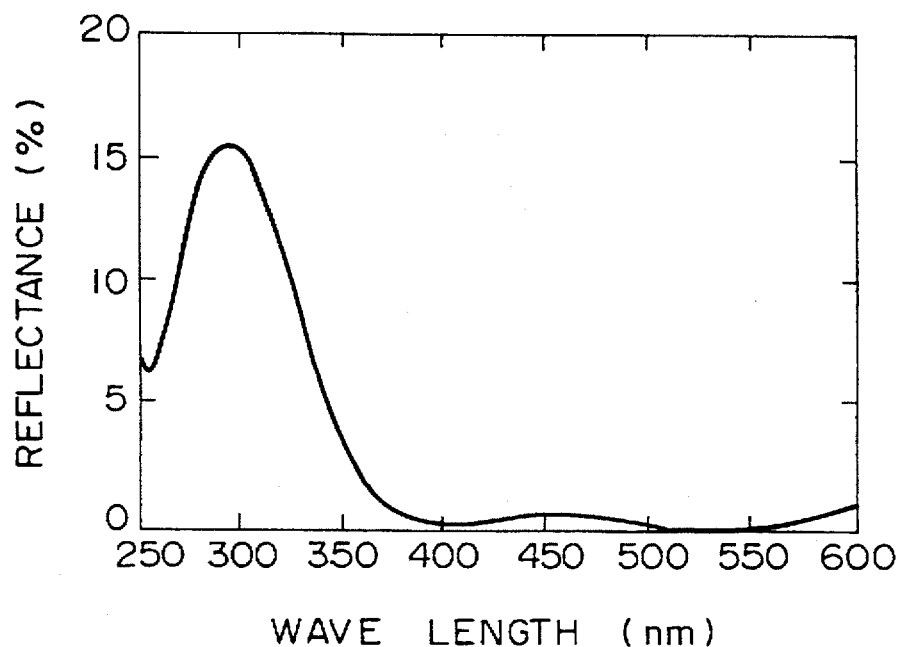
FIG. 2 is a characteristic diagram showing the results of spectrophotometry on the ultraviolet optical thin film relating to Example 1 of the present invention.

The preferred embodiments of the present invention are illustrated below with reference to FIGS. 1 through 7.

In FIG. 1(a), there is shown an example of a construction of an ultraviolet light source unit in relation to the present invention, wherein the wavelength of a laser beam emitted from a semiconductor laser is shorten by using two wavelength-changing devices. At first, a semiconductor laser 2 is oscillated by a laser-oscillating circuit 1 to emit a laser beam 6. The laser beam 6 then excites a solid state laser 3 such as a YAG laser. The laser beam emitted from the excited solid state laser 3 is incident on a non-linear optical crystal 4, and the wavelength is changed by utilizing a SHG phenomenon. The laser beam having the changed wavelength is incident on a non-linear optical crystal 5, and the wavelength is further changed by utilizing a FHG phenomenon. The objective ultraviolet ray 7 is obtained through this wavelength-changing process. Here, ultraviolet antireflection films 8 having a low reflectance against the ultraviolet ray 7 are formed on the non-linear optical crystal 5 by vacuum deposition.

Figure 7:
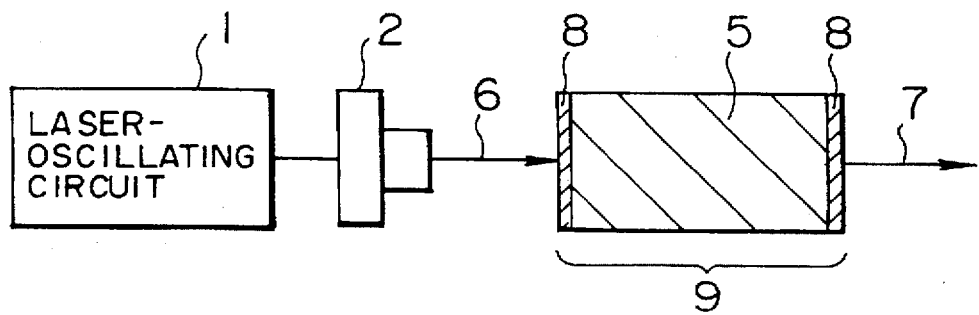
FIG. 7 is a schematic drawing showing an example of the construction of another ultraviolet light source unit in relation to the present invention, wherein the wavelength of a laser beam emitted from a semiconductor laser is shorten by using only one wavelength-changing device.
Figure 8:
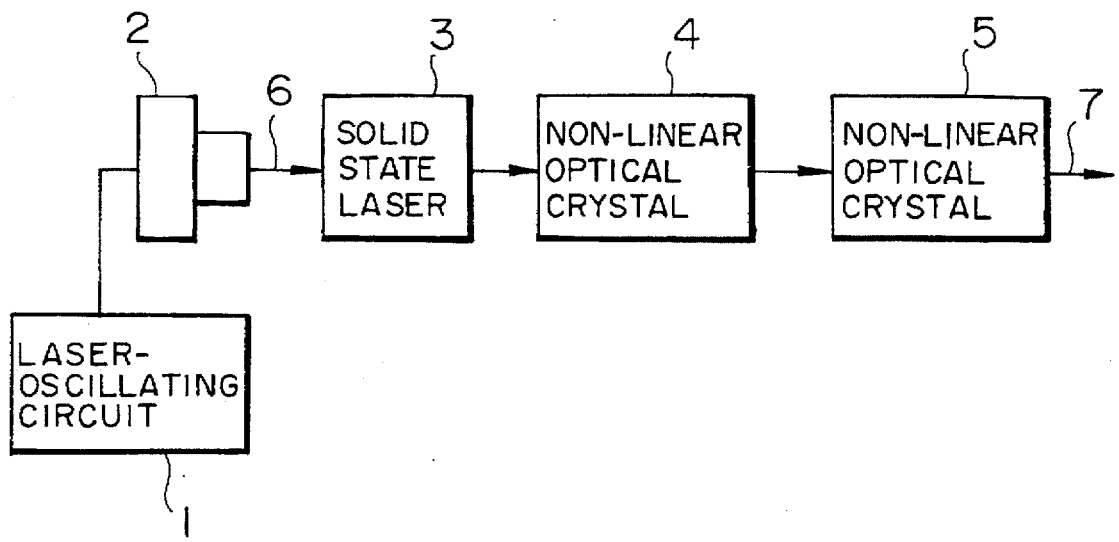
FIG. 8 is a schematic drawing showing an example of the construction of an ultraviolet light source unit in relation to the prior art, wherein the wavelength of a laser beam emitted from a semiconductor laser is shorten by using two wavelength-changing devices.

In FIG. 7, there is shown an example of the construction of another ultraviolet light source unit in relation to the present invention, wherein the wavelength of a laser beam emitted from a semiconductor laser is shorten by using only one wavelength-changing device since the semiconductor laser used herein generates a laser beam having a relatively short wavelength. At first, a semiconductor laser 2 is oscillated by a laser-oscillating circuit 1 to emit a laser beam 6. The laser beam 6 is then incident on a non-linear optical crystal 5, and the wavelength is changed by utilizing a SHG phenomenon. The objective ultraviolet ray 7 is obtained through this wavelength-changing process. Here, ultraviolet optical thin films 8 having a low reflectance against the ultraviolet ray 7 are formed on the non-linear optical crystal 5 by vacuum deposition.

Each ultraviolet optical thin film 8 above is formed using deposition materials having high thermal conductivities, and has high durability against ultraviolet rays and high reliability for long-term use. Specifically, as is shown in FIG. 1(b), an ultraviolet optical thin film 8 comprises a first layer 10 formed on a non-linear optical crystal 5 and a second layer 11, wherein these layers consist of deposition materials having conductivities of 0.01 J·cm$^{-1}$·sec$^{-1}$·K$^{-1}$ or greater, and more specifically, these layers consist of HfO$_2$ (conductivity: 0.016 J·cm$^{-1}$·sec$^{-1}$·K$^{-1}$) and MgF$_2$ (conductivity: 0.15 J·cm$^{-1}$·sec$^{-1}$·K$^{-1}$), respectively (therefore, these layers may hereinafter be referred to as an HfO$_2$ layer and an MgF$_2$ layer, respectively).

The ultraviolet optical thin film 8 comprising the above-mentioned materials is formed on a non-linear optical crystal 5 to constitute a wavelength-changing device 9. Specifically, the ultraviolet optical thin film 8 is formed to constitute a wavelength-changing device 9 on a non-linear optical crystal 5 which has a function of generating the forth higher harmonic, for example, has a function of emitting an ultraviolet ray of 266 nm with respect to an incident ray of 532 nm.

Further, a single crystal of KDP, BBO, or the like is used as the non-linear optical crystal 5. The below-described Examples 1 through 4 illustrate wavelength-changing devices 9, each of which comprises a non-linear optical crystal 5 consisting of a BBO single crystal and an ultraviolet optical thin film 8 comprising the above-mentioned two layers, and each of which has a low reflectance against the fundamental wave of 532 nm.

Additionally, FIG. 1(c) shows an ultraviolet optical thin film 8 which further comprises a layer 12 consisting of MgO (therefore, this layer may be hereinafter referred to as an MgO layer) between the HfO$_2$ layer 10 and the MgF$_2$ layer 11. This ultraviolet optical thin film 8 is also formed on a non-linear optical crystal 5 to constitute a wavelength-changing device 9. The below-described Example 5 illustrates a wavelength-changing device 9 which comprises a non-linear optical crystal 5 consisting of a BBO single crystal and an ultraviolet optical thin film 8 comprising the above-mentioned three layers, and which has a low reflectance against the fundamental wave of 532 nm.

Here, wavelength-dispersion formulae relative to a uniaxial BBO single crystal are as follows.

$$n_o^2 = 1.9595 + 0.7892\lambda^2/(\lambda^2 - 0.02161) \qquad \text{I}$$

$$n_e^2 = 1.6932 + 0.6782\lambda^2/(\lambda^2 - 0.01816) \qquad \text{II}$$

$$n_e(\theta)^2 = 1/(\cos^2\theta/n_o^2 + \sin^2\theta/n_e^2) \qquad \text{III}$$

In the above formulae, $\lambda$ is the wavelength, $n_o$ is the ordinary index, $n_e$ is the refractive index of extraordinary ray, and $n_e(\theta)$ is the refractive index of extraordinary ray incident at an angle of $\theta$ relative to the optical axis of the single crystal. From the wavelength-dispersion formulae I through III, the phase matching condition of the BBO single crystal relative to the fundamental wavelength of 532 nm is obtained as 47.6°. When a fundamental wave is incident on the BBO single crystal at such an angle, the forth higher harmonic will be most efficiently generated.

Next, the construction of wavelength-changing devices 9, each of which comprises one of the above-described ultraviolet optical thin films 8 and a BBO single crystal used as the non-linear optical crystal 5, will be illustrated with reference to FIGS. 2 through 6 and Tables 1 through 5. Tables 1 through 5 show the refractive indexes and the phase layer-thicknesses of materials constituting the wavelength-changing devices 9 of Examples 1 through 5. Here, a phase layer-thickness is calculated by multiplying a physical layer-thickness d by a refractive index n, and subsequently dividing by a fundamental wavelength $\lambda_0$, namely, the phase layer-thickness is expressed by $nd/\lambda_0$. Incidentally, the refractive index used herein is the value relative to the ray having a wavelength of 532 nm.

EXAMPLE 1

The construction of the wavelength-changing device of Example 1 is shown in Table 1 below.

TABLE 1

| Constituents | BBO | HfO$_2$ | MgF$_2$ |
| --- | --- | --- | --- |
| Refractive Index*[1] | 1.67 | 2.10 | 1.38 |
| Phase Layer-thickness*[2] |  | 0.510 | 0.241 |

*[1]: The refractive index of the air is considered as 1.
*[2]: The fundamental wavelength is 457 nm.

This example is a wavelength-changing device 9 constructed using a BBO single crystal as the non-linear optical crystal 5; and an ultraviolet optical thin film 8 which comprises an HfO$_2$ layer 10 as the first layer on the BBO single crystal and an MgF$_2$ layer 11 as the second layer. These HfO$_2$ layer 10 and MgF$_2$ layer 11 are deposited by ion plating and ordinary vapor deposition, respectively, to form the ultraviolet optical thin film 8 having a two-layer structure.

FIG. 2 is a characteristic diagram showing the results of spectrophotometry on this ultraviolet optical thin film 8. As is obvious from FIG. 2, a low-reflection characteristic relative to the fundamental wave of 532 nm was achieved. Incidentally, in FIG. 2, the axis of the abscissa is the wavelengths of the measuring ray, and the axis of the ordinates is the reflectance at the wavelength.

Figure 9:
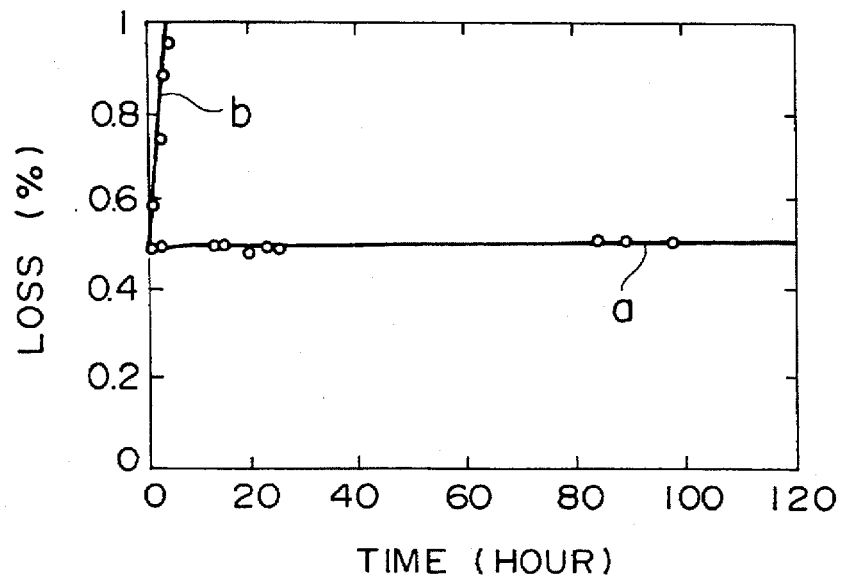
FIG. 9 is a characteristic diagram showing time-lapse change in performance of the ultraviolet optical thin film relating to Example 1 of the present invention, and showing that of a conventional ultraviolet optical thin film.

Further, the curve a in FIG. 9 shows the measurement results of the time-lapse change in loss due to reflection, scattering, and absorption when the ultraviolet optical thin film 8 is irradiated with an ultraviolet ray which has a wavelength of 266 nm, an output level of 100 mW, and a power density of 1 kW/cm$^2$. Increase in the loss means deterioration of the ultraviolet optical thin film. As is obvious from the curve a in FIG. 9, the ultraviolet optical thin film 8 of Example 1 does not deteriorate even with 100 hours or longer of exposure to ultraviolet rays.

EXAMPLE 2

The construction of the wavelength-changing device of Example 2 is shown in Table 2 below.

TABLE 2

| Constituents | BBO | HfO$_2$ | MgF$_2$ |
| --- | --- | --- | --- |
| Refractive Index*[1] | 1.67 | 2.10 | 1.38 |
| Phase Layer-thickness*[2] |  | 0.069 | 0.297 |

*[1]: The refractive index of the air is considered as 1.
*[2]: The fundamental wavelength is 532 nm.

This example has the same construction as that of Example 1, but differs in the thickness of the HfO$_2$ layer and the MgF$_2$ layer. Also, the methods for forming the ultraviolet optical thin film 8 are the same as in Example 1.

Figure 3:
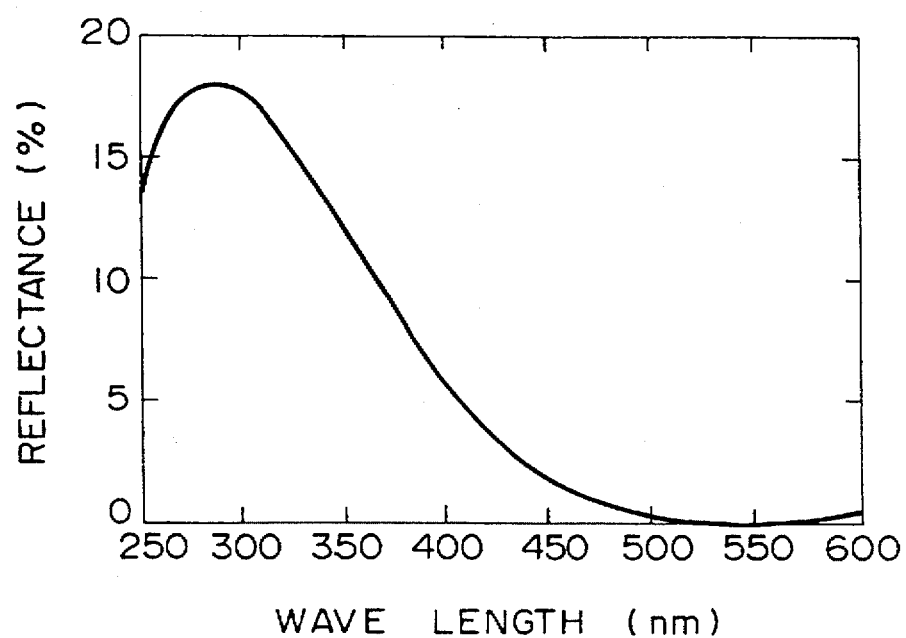
FIG. 3 is a characteristic diagram showing the results of spectrophotometry on the ultraviolet optical thin film relating to Example 2 of the present invention.

FIG. 3 is a characteristic diagram showing the results of spectrophotometry on this ultraviolet optical thin film 8. As is obvious from FIG. 3, a low-reflection characteristic relative to the fundamental wave of 532 nm was achieved. Incidentally, in FIG. 3, the axis of the abscissas is the wavelengths of the measuring ray, and the axis of the ordinates is the reflectance at the wavelength.

Though not shown with a drawing, measurement results of the time-lapse change in loss similar to those in Example 1 were obtained in this example, namely, the ultraviolet optical thin film 8 of Example 2 was found to have high durability against ultraviolet rays.

EXAMPLE 3

The construction of the wavelength-changing device of Example 3 is shown in Table 3 below.

TABLE 3

| Constituents | BBO | HfO$_2$ | MgF$_2$ |
| --- | --- | --- | --- |
| Refractive Index*[1] | 1.67 | 2.10 | 1.38 |
| Phase Layer-thickness*[2] |  | 0.500 | 0.252 |

*[1]: The refractive index of the air is considered as 1.
*[2]: The fundamental wavelength is 608 nm.

Similar to Example 2, this example has the same construction as that of Example 1, but differs in thickness of the HfO$_2$ layer and the MgF$_2$ layer. Also, the methods for forming the ultraviolet optical thin film 8 are the same as in Example 1.

Figure 4:
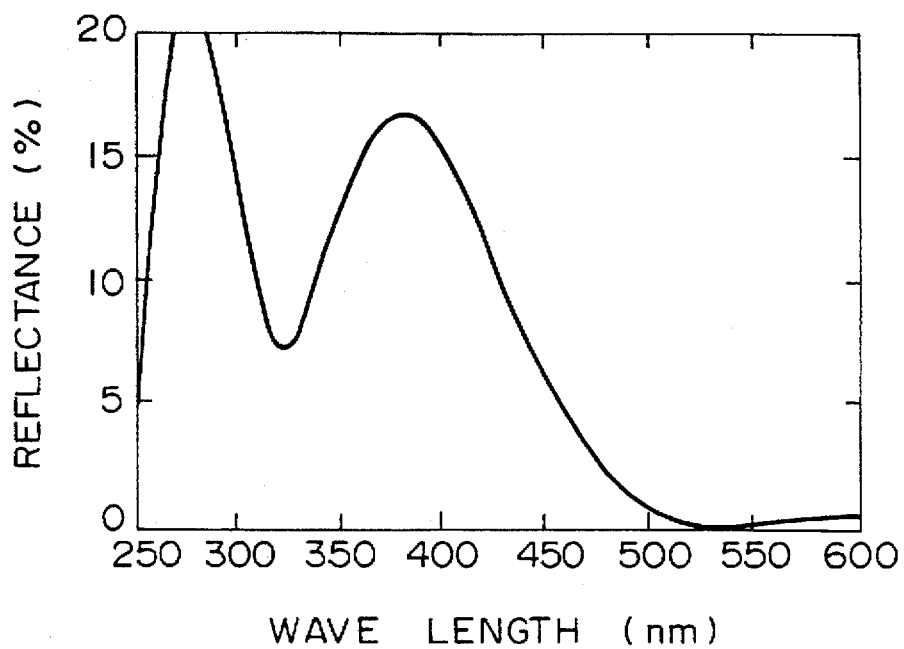
FIG. 4 is a characteristic diagram showing the results of spectrophotometry on the ultraviolet optical thin film relating to Example 3 of the present invention.

FIG. 4 is a characteristic diagram showing the results of spectrophotometry on this ultraviolet optical thin film 8. As is obvious from FIG. 4, a low-reflection characteristic relative to the fundamental wave of 532 nm was achieved. Incidentally, in FIG. 4, the axis of the abscissas is the wavelengths of the measuring ray, and the axis of the ordinates is the reflectance at the wavelength.

Though not shown with a drawing, measurement results of the time-lapse change in loss similar to those in Example 1 were obtained also in this example, namely, the ultraviolet optical thin film 8 of Example 3 was found to have high durability against ultraviolet rays.

EXAMPLE 4

The construction of the wavelength-changing device of Example 4 is shown in Table 4 below.

TABLE 4

| Constituents | BBO | HfO$_2$ | MgF$_2$ |
| --- | --- | --- | --- |
| Refractive Index*[1] | 1.67 | 2.10 | 1.38 |
| Phase Layer-thickness*[2] | | 0.433 | 0.204 |

*[1]: The refractive index of the air is considered as 1.
*[2]: The fundamental wavelength is 532 nm.

Similar to Examples 2 and 3, this example has the same construction as that of Example 1, but differs in thickness of the HfO$_2$ layer and the MgF$_2$ layer. Also, the methods for forming the ultraviolet optical thin film 8 are the same as in Example 1.

Figure 5:
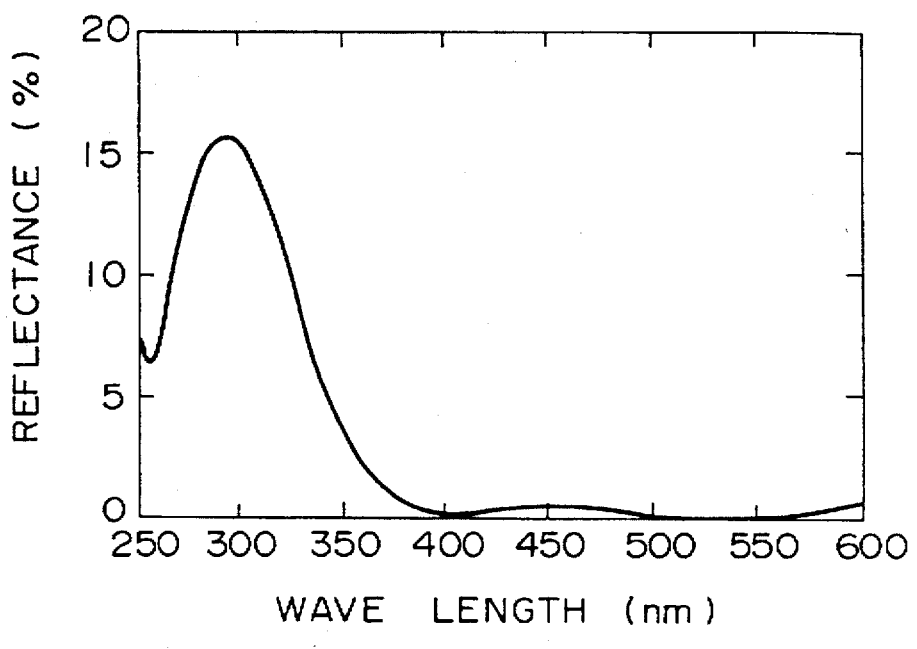
FIG. 5 is a characteristic diagram showing the results of spectrophotometry on the ultraviolet optical thin film relating to Example 4 of the present invention.

FIG. 5 is a characteristic diagram showing the results of spectrophotometry on this ultraviolet optical thin film 8. As is obvious from FIG. 5, a low-reflection characteristic relative to the fundamental wave of 532 nm was achieved. Incidentally, in FIG. 5, the axis of the abscissas is the wavelengths of the measuring ray, and the axis of the ordinates is the reflectance at the wavelength.

Though not shown with a drawing, measurement results of the time-lapse change in loss similar to those in Example 1 were obtained also in this example, namely, the ultraviolet optical thin film 8 of Example 4 was found to have high durability against ultraviolet rays.

EXAMPLE 5

The construction of the wavelength-changing device of Example 5 is shown in Table 5 below.

TABLE 5

| Constituents | BBO | HfO$_2$ | MgO | MgF$_2$ |
| --- | --- | --- | --- | --- |
| Refractive Index*[1] | 1.67 | 2.10 | 1.70 | 1.38 |
| Phase Layer-thickness*[2] | | 0.205 | 0.206 | 0.110 |

*[1]: The refractive index of the air is considered as 1.
*[2]: The fundamental wavelength is 532 nm.

This example is a wavelength-changing device 9 constructed with a BBO single crystal as the non-linear optical crystal 5; and an ultraviolet optical thin film 8 which comprises an HfO$_2$ layer 10 as the first layer on the BBO single crystal, an MgO layer 12 as the second layer, and an MgF$_2$ layer 11 as the third layer. The HfO$_2$ layer 10 is deposited by ion plating, while the MgF$_2$ layer 11 and MgO layer 12 are deposited by ordinary vapor deposition, respectively, to form the ultraviolet optical thin film 8 having a three-layer structure.

Figure 6:
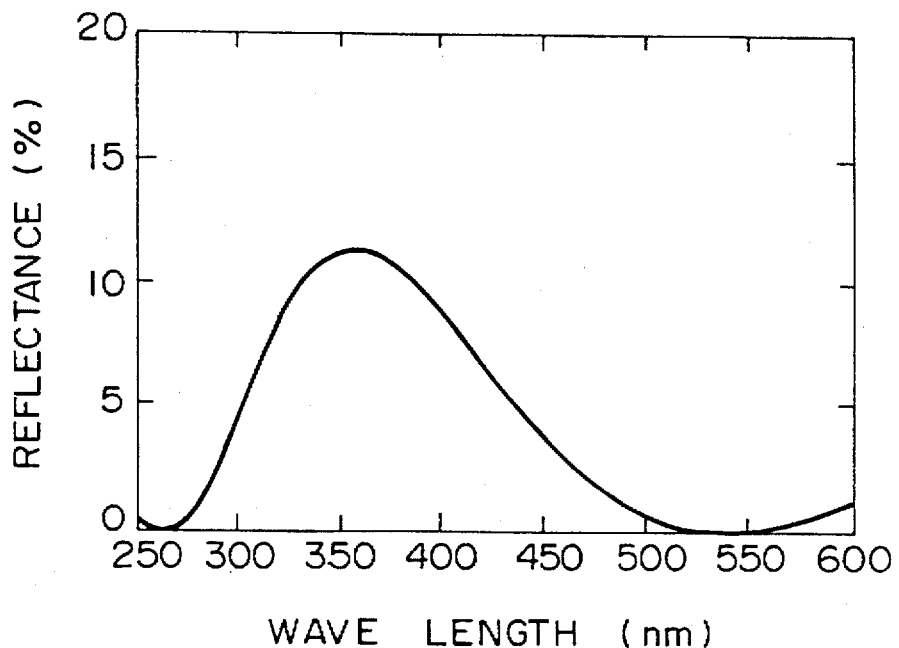
FIG. 6 is a characteristic diagram showing the results of spectrophotometry on the ultraviolet optical thin film relating to Example 5 of the present invention.

FIG. 6 is a characteristic diagram showing the results of spectrophotometry on this ultraviolet optical thin film 8. As is obvious from FIG. 6, a low-reflection characteristic relative to the fundamental wave of 532 nm was achieved. Incidentally, in FIG. 6, the axis of the abscissas is the wavelengths of the measuring ray, and the axis of the ordinates is the reflectance at the wavelength.

Though not shown with a drawing, measurement results of the time-lapse change in loss similar to those in Example 1 were obtained also in this example, namely, the ultraviolet optical thin film 8 of Example 5 was found to have a high durability against ultraviolet rays.

As described above, a highly durable wavelength-changing device for changing the wavelength of a laser beam can be obtained by applying the ultraviolet optical thin film of the present invention to a non-linear optical crystal. As a matter of course, the use of the ultraviolet optical thin film is not limited to only such a device. The ultraviolet optical thin film of the present invention is markedly effective also when it is applied to optical parts to be exposed to ultraviolet rays, such as ultraviolet light source units.

What is claimed is:

1. An ultraviolet optical part for use with ultraviolet rays continuously generated in a wavelength of 200 through 300 nm, comprising an optical component and an ultraviolet optical thin film formed on said optical component, wherein said ultraviolet optical thin film comprises a material having a thermal conductivity of 0.01 J·cm$^{-1}$·sec$^{-1}$·K$^{-1}$ or greater.

2. The ultraviolet optical part according to claim 1, wherein said ultraviolet optical thin film comprises a first layer comprising HfO$_2$ on said optical component and a second layer comprising MgF$_2$ on said first layer.

3. The ultraviolet optical part according to claim 1, wherein said ultraviolet optical thin film comprises a first layer comprising HfO$_2$ on said optical component, a second layer comprising MgO on said first layer, and a third layer comprising MgF$_2$ on said second layer.

4. A wavelength-changing device comprising an optical crystal and an ultraviolet optical thin film formed on said optical crystal, the wavelength-changing device being capable of continuously generating an ultraviolet higher harmonic having a wavelength of 200 through 300 nm, wherein said ultraviolet optical thin film comprises a material having a thermal conductivity of 0.01 J·cm$^{-1}$·sec$^{-1}$·K$^{-1}$ or greater.

5. The wavelength-changing device according to claim 4, wherein said ultraviolet optical thin film comprises a first layer comprising HfO$_2$ on said optical component and a second layer comprising MgF$_2$ on said first layer.

6. The wavelength-changing device according to claim 4, wherein said ultraviolet optical thin film comprises a first layer comprising HfO$_2$ on said optical component, a second layer comprising MgO on said first layer, and a third layer comprising MgF$_2$ on said second layer.

7. The wavelength-changing device according to claim 4, wherein said optical crystal comprises β-barium borate.

8. The wavelength-changing device according to claim 4, wherein said optical crystal comprises potassium dihydrogenphosphate.

9. An ultraviolet light source unit comprising an illuminant which emits a fundamental wave, and an optical crystal which changes the fundamental wave incident on the optical crystal into an ultraviolet higher harmonic having a wavelength of 200 through 300 nm, wherein an ultraviolet optical thin film having a thermal conductivity of 0.01 J·cm$^{-1}$·sec$^{-1}$·K$^{-1}$ or greater is formed on said optical crystal.

* * * * *